April 13, 1937.　　F. M. CARROLL　　2,076,705

ASSORTING MACHINE

Filed April 6, 1934　　9 Sheets—Sheet 1

INVENTOR
Fred M. Carroll
BY his ATTORNEY
A. C. Maby

April 13, 1937.  F. M. CARROLL  2,076,705
ASSORTING MACHINE
Filed April 6, 1934  9 Sheets-Sheet 4

April 13, 1937.　　F. M. CARROLL　　2,076,705
ASSORTING MACHINE
Filed April 6, 1934　　9 Sheets-Sheet 5

INVENTOR
Fred M. Carroll
BY
A. C. Maby
ATTORNEY

April 13, 1937.    F. M. CARROLL    2,076,705
ASSORTING MACHINE
Filed April 6, 1934    9 Sheets-Sheet 6

INVENTOR
Fred M. Carroll
BY
ATTORNEY

April 13, 1937.  F. M. CARROLL  2,076,705
ASSORTING MACHINE
Filed April 6, 1934  9 Sheets-Sheet 7
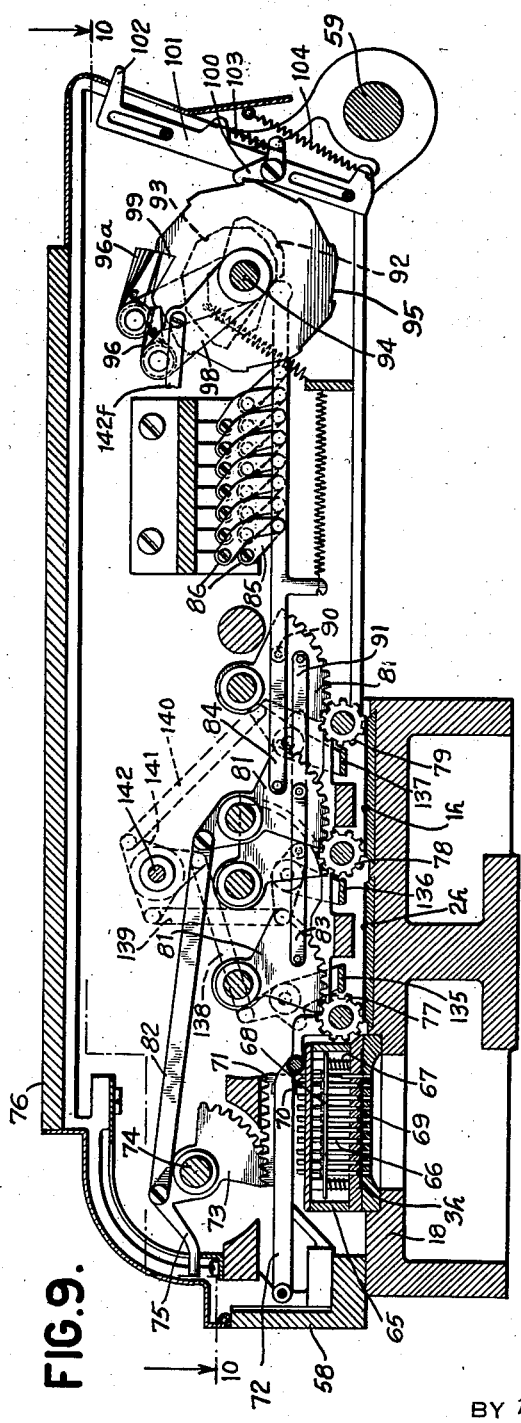
INVENTOR
Fred M. Carroll
BY his ATTORNEY April 13, 1937. F. M. CARROLL 2,076,705
ASSORTING MACHINE
Filed April 6, 1934 9 Sheets-Sheet 8
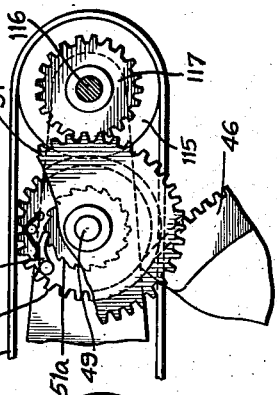
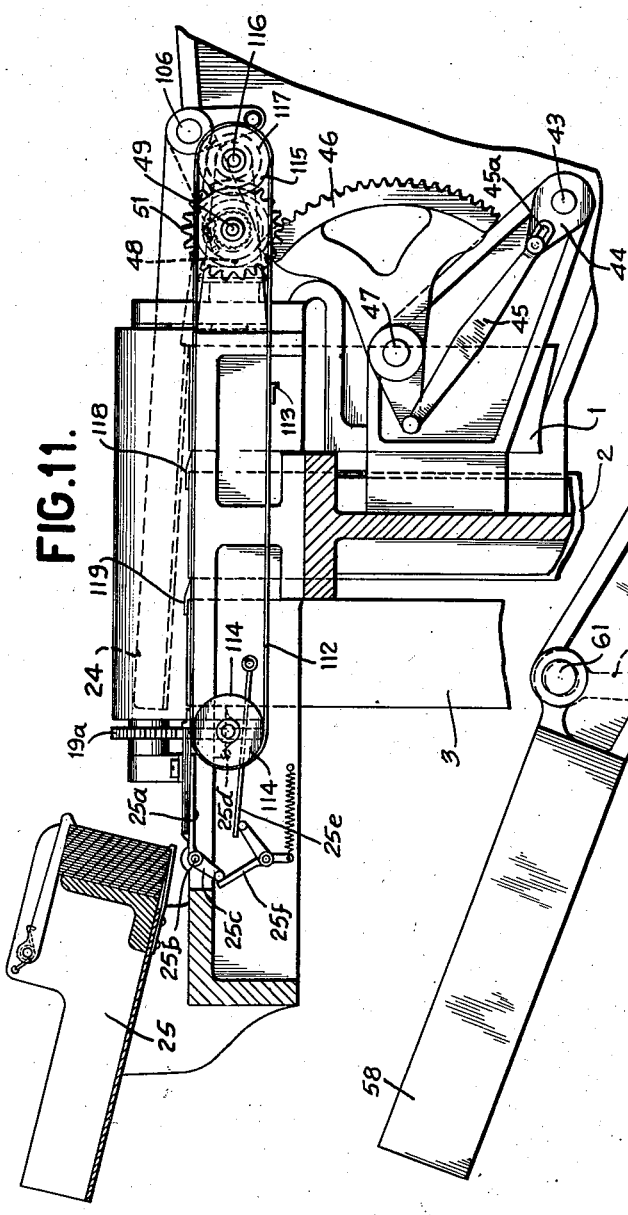
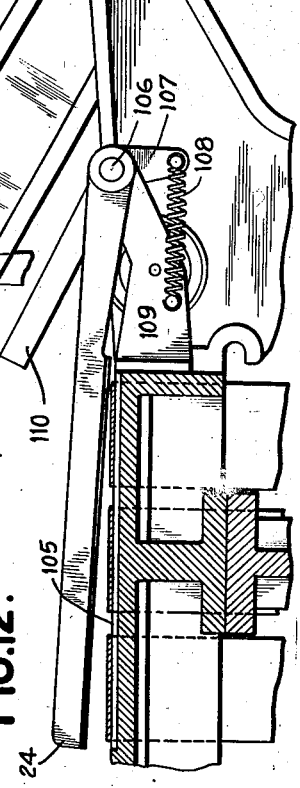
INVENTOR
Fred M. Carroll
BY his ATTORNEY April 13, 1937.   F. M. CARROLL   2,076,705
ASSORTING MACHINE
Filed April 6, 1934   9 Sheets-Sheet 9

INVENTOR
Fred M. Carroll
BY
A.C. Maby
ATTORNEY

Patented Apr. 13, 1937

2,076,705

UNITED STATES PATENT OFFICE 2,076,705

ASSORTING MACHINE

Fred M. Carroll, Binghamton, N. Y., assignor to International Business Machines Corporation, New York, N. Y., a corporation of New York Application April 6, 1934, Serial No. 719,308

7 Claims. (Cl. 101—19)

This invention relates to machines for making up pads or books such as sales books in which several slips or pages are required for each transaction and in which certain differences occur in the several sheets. For instance, the sheets may be scored at different places to permit separation into several parts and also, at least one of the sheets may constitute a perforated record card in which certain entries are punched before the bock is made up.

One of the objects of the invention is to provide a machine which will print the several sheets simultaneously, score the sheets in the various appropriate places and perforate one of the sheets.

Another object is to provide mechanism for perforating one of the sheets and to print the data represented by such perforations on one or more of the other sheets.

Another object is to provide means for progressively changing the perforations to represent serial numbering.

Another object is to provide serial numbering printing mechanism coordinated with serial number punching mechanism so as to print on certain of the slips the data represented by the perforations on the punched slip.

Another object is to provide mechanism for cutting the stock in proper lengths and for stacking the slips in correct order.

Referring to the drawings:

Fig. 1 shows one of the pages or slips of the sales book with printed data and scored at various places to permit the separation of the slip into several parts.

Fig. 2 shows a duplicate slip adapted to occupy a position in the book directly below the slip of Fig. 1 and is scored so that it may be removed from the book.

Fig. 3 shows a slip adapted to be used to control a perforated-record-controlled tabulating machine.

Fig. 9 is a section taken on line 9—9 of Fig. 5 showing the mechanism adapted to be set to control the printing and punching of numbers.

Fig. 10 is a sectional plan view of the mechanism shown in Fig. 9 taken on line 10—10 of Fig. 9.

Fig. 11 is a sectional detail taken substantially on line 11—11 of Fig. 5.

Fig. 12 is a detail of part of Fig. 11 and including additional parts.

Fig. 13 is a detail of a clutch for operating the feed device for disposing of the several sheets after they have been cut off.

Fig. 14 is an enlarged detail of mechanism for advancing the serial numbering device once for each operation.

Fig. 15 is a side view of the device shown in Fig. 14.

Figure 4:
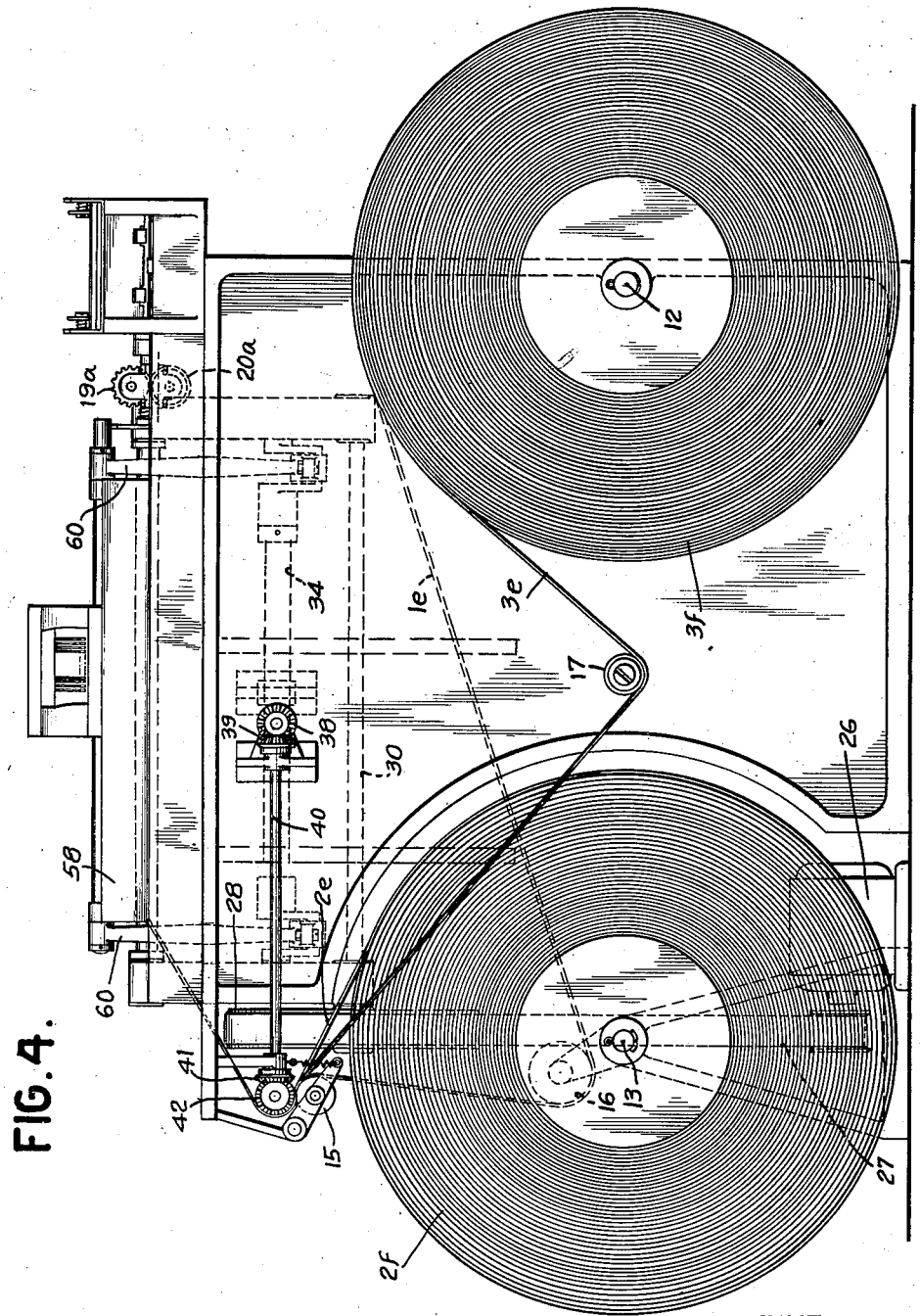
Fig. 4 is a front elevation of the machine adapted to print and punch the various slips and to stack them in order ready for binding.

Referring to Fig. 1, the slip 1 is shown as comprising four parts, 1a, 1b, 1c and 1d, the portion 1a being simply the end of the slip at which the slip is fastened in the book. The scoring at 5, 6 and 7 permits the separation of the slip into three separate parts for disposal in several ways. For instance, one of the slips may be placed in a package containing the article sold and another may be placed outside of the package indicating the name and address of the person to whom the package is to be sent. The various slips of Fig. 1 contain printed matter including numbers representing the department in which the transaction is made, the number of the clerk making the transaction, the number of the sales book, and the number of the check in the sales book. The slip of Fig. 2 is divided into two portions, 2 and 2a, the portion 2a being the end at which the slip is fastened in the book. This slip is scored along the line 8 so that it may be removed from the book. The numbers representing the department, clerk, book and check are printed but once on this slip instead at three different places as in the case of Fig. 1. In other respects the printed matter on this duplicate slip is substantially similar to that of Fig. 1.

Fig. 3 shows a record card 3 adapted to control a perforated record tabulating machine and is adapted to be separated from the end 3a along the scored line 9. The scoring of this slip or card is different from that of the slips 1 and 2 in that the points 10 where the paper will be torn in removing the card from the book are removed from the edge of the card so as not to interfere with the feeding of the card and the registration thereof in tabulating and sorting machines. The card shows printed matter including lines, substantially similar to slips 1 and 2, but instead of the printing of the numbers representing the department, clerk, book and check, these numbers are represented by perforations 11.

Each sales book will contain a fixed number of sales slips and all slips of a given book will contain the same book number and each book will bear a different number. It is, therefore, necessary to change the numbering mechanism, including the mechanism for printing the numbers on the slips 1 and 2 and for punching the numbers on the slip 3 for each book. In other words, if there are 60 sets of sales slips to each book the book numbering mechanism will change progressively once for every 60 printing and punching operations. The mechanism for printing and punching the check number is adapted to change progressively between each printing and punching operation of the machine so that the three slips of the first printing operation will be numbered, check 1, the next three (the second printing operation) will be numbered check 2, and so on. The department number may be changed by the operator of the machine from time to time after the desired number of books for a given department have been prepared. This is also true of the clerk number.

In Fig. 4 the paper stock 3e for the cards 3 is supplied from a roll 3f mounted at 12. The stock 2e from which the slips 2 are produced is supplied from a roll 2f mounted on a spindle 13. The roll 3f is mounted on the right side of the machine and the roll 2f on the left side. The stock 1e from which the slips 1 are produced is supplied from a roll 1f mounted on the right side of the machine back of the roll 3f, (see Fig. 5). The slip of paper 2e runs directly from the reel 2f to the feed rollers 14, 15 (Figs. 4 and 6) while the strip 1e first passes around an idler 16 and then between the feed rollers 14, 15; and the strip 3e first passes around an idler 17 and then to the rollers 14, 15. From the rollers 14, 15 the strips of stock pass upwardly to the bed plate 18 (Fig. 6), across the said plate to the right side of the machine, between the feed rollers 19, 20.

The printing and perforating of the various slips is effected on this bed plate and is done in three stages; for instance, the printing of the three slips may all be done in the first position 21, the perforating of the card 3 may be done in the second position 22, and the scoring of the several slips may be effected at the third position 23.

The feeding mechanism, of course, is adapted to move the stock a distance equal to the length of the slips between each printing and punching operation. Concurrently with each printing and punching operation of the machine a cutting blade 24 is depressed to cut off the slips that have been completely printed and punched. The completed slips are then at the right end of the machine on top of the portion 18a of the bed plate. The three slips will then be carried and deposited in proper order in the tray 25 by mechanisms to be described later.

*Drive mechanism*

Figure 5:
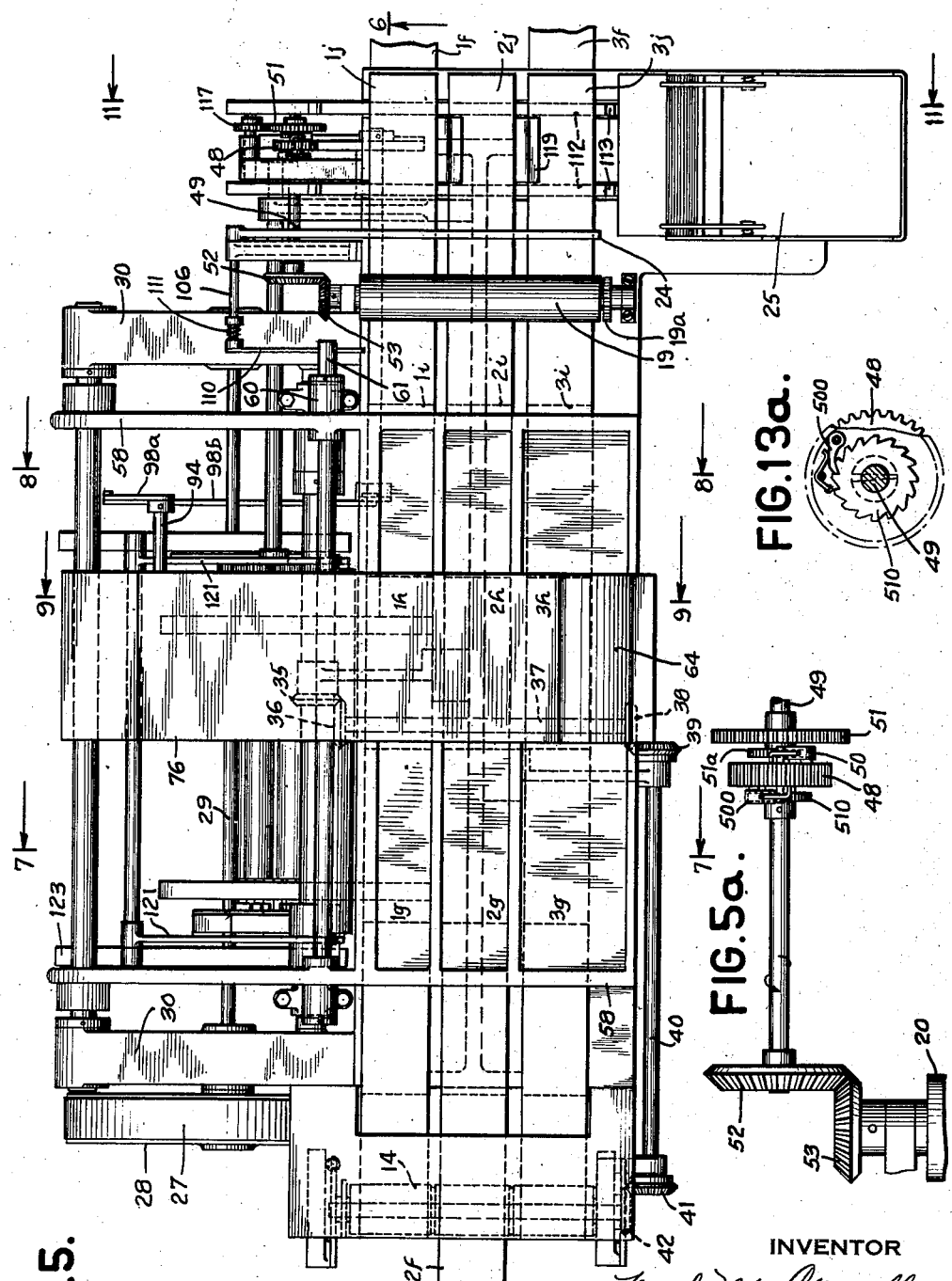
Fig. 5 is a plan view of the machine shown in Fig. 4.
Figure 7:
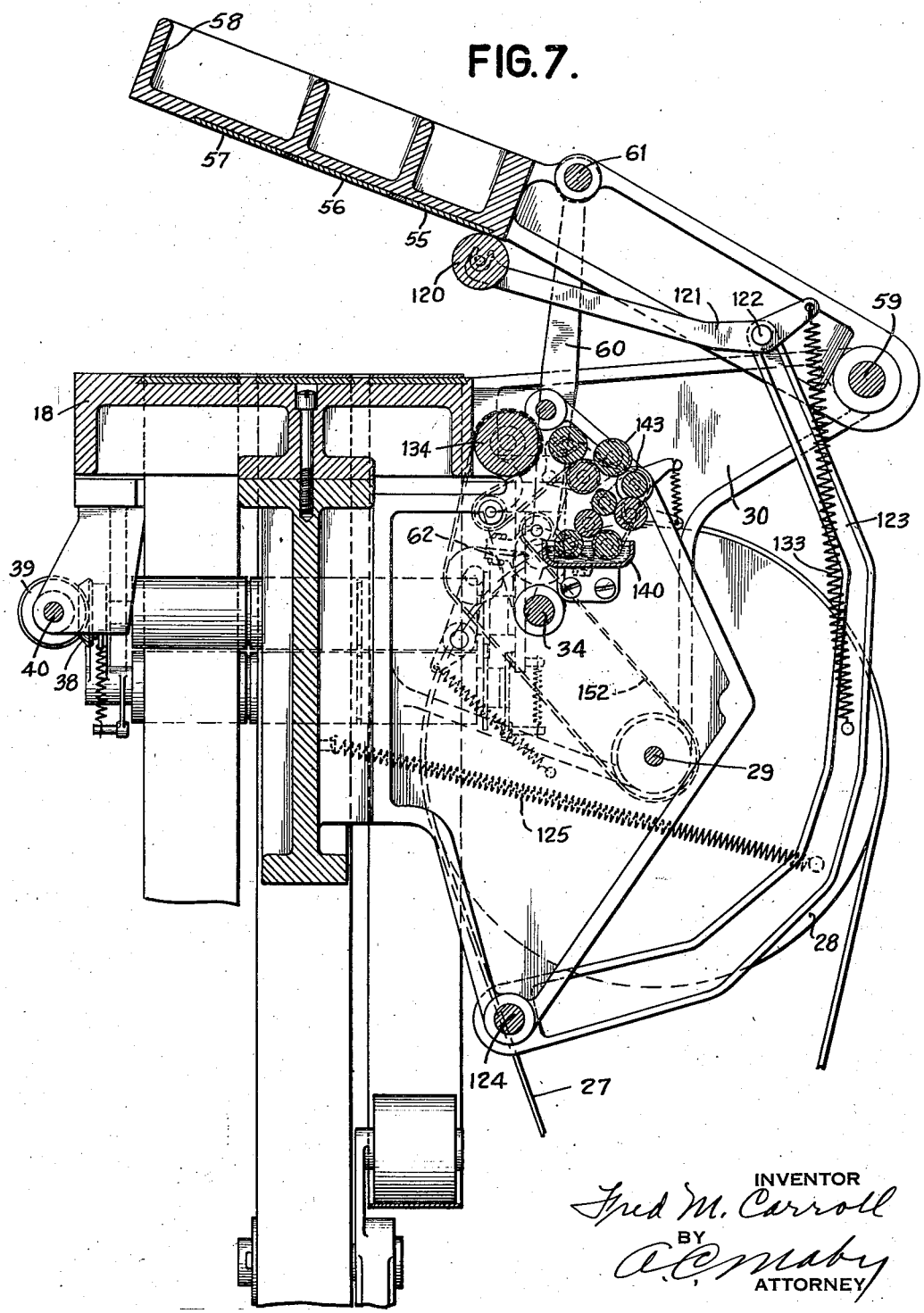
Fig. 7 is a sectional side elevation taken substantially on line 7—7 of Fig. 5.

The operation of the machine is effected by an electric motor 26 (Fig. 4) connected by a belt 27 to a pulley 28 (see also Figs. 5 and 7). The pulley 28 is mounted on a shaft 29 carried by the frame 30 of the machine. Shaft 29 is provided with a pinion 31 (see Fig. 8) meshing with a gear 32 which in turn meshes with a gear 33 mounted on shaft 34. Shaft 34 is provided with a bevelled gear 35 meshing with a bevelled gear 36 fixed on shaft 37. Shaft 37 also has a bevelled gear 38 meshing with a similar gear 39 on shaft 40 which is connected by bevelled gears 41, 42 to the upper feed roller 14 to operate the latter. Rollers 15 are driven through gears 15a. The stock will thus be fed constantly by the rotation of rollers 14, 15 but is drawn into the machine for printing and punching periodically, at the end of each printing and punching operation.

The operation of rollers 19, 20 for drawing the stock into the machine is as follows: The constantly running main drive shaft 29, through the gears 31, 32 causes the shaft 43 on which gear 32 is mounted, to rotate constantly. The end of the shaft 43 (Figs. 6 and 11) is provided with a crank arm 44 connected by link 45 to the rear end of a segmental gear 46 on shaft 47. Segment 46 meshes with a gear 48 loosely mounted on a shaft 49. The segment 46 turns back and forth once for each revolution of the shaft 43 and thus causes the gear 48 to turn first in one direction and then back in the opposite direction. A pawl 500 carried by the gear 48 (Figs. 5a ad 13a) and operating a ratchet 510 fixed on the shaft 49, turns the latter shaft counterclockwise while the segment 46 is moving clockwise; the shaft remaining idle while the segment is moving in the opposite direction. Shaft 49 has fixed thereon a bevelled gear 52 meshing with a similar gear 53 (Fig. 5) carried on the shaft on which the feed roller 20 is mounted. Intermeshing gears 19a, 20a are provided between rollers 19, 20. Thus the feed rollers 19, 20 are turned when the segment 46 moves in one direction and remain idle when the segment moves in the opposite direction. The distance through which the feed rollers turn is equal to the length of the slips or cards 1, 2 and 3 so that the material is fed the desired distance once for each cycle of operation of the machine.

In thus feeding the strips of material, the segment 46 has moved from its upper position, in a clockwise direction, to the position of Fig. 11. While shaft 43 continues to turn, taking up the lost motion in the slot 45a in link 45, the frame 58 which has moved down almost into engagement with the strips, will continue to the point of engagement to effect printing and punching. During this latter part of the stroke stud 61 will operate the cutter 24 to cut off the finished cards.

*Printing*

In Fig. 7, the plate for printing on the slip 1 is shown at 55; the plate for printing on the slip 2 is shown at 56 and the plate for printing on the card 3 is shown at 57. These plates are carried by a frame 58 pivoted at 59 to the fixed framework 30 of the machine and adapted to be raised and lowered by connecting links 60 (see also Figs. 4 and 6). These links are connected to a rod 61 carried by the frame 58 and to the crank portions 62 of the shaft 34. Once each cycle of operation of the machine, the frame 58 is raised to the position of Fig. 7 and then returned to cooperation with bed plate 18. When it is lowered the type plates engage the slips and effect the printing. All of the printing of the three slips is effected by this type when the slips (that is, the portions of the stock from which the particular slips are to be cut) are in the positions 1g, 2g and 3g as indicated by the dotted lines in Fig. 5 (see also Fig. 17), excepting the numbers under the headings, Dept., Clerk, Book and Check. As these numbers are constantly changing, special printing devices are provided for the printing of such numbers. The scoring of the slips along the lines 5, 6, 7, 8 and 9 (Figs. 1, 2, 3 and 17) is effected by scoring devices at 63 (Fig. 8) in the third position designated 1i, 2i 3i. The scoring devices are also carried by the frame 58 and effect the scoring when the frame is brought down for printing.

It is to be understood that the feeding of the stock takes place while the frame 58 is in its upper position, i. e. while it is being raised and lowered.

Figures 17, 18:
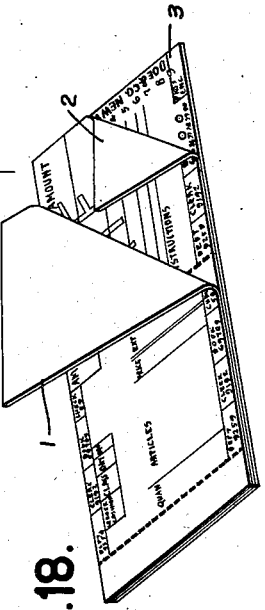
Fig. 17 is a view showing the several strips of material after the completion of the several steps in printing and perforating.
Fig. 18 shows the three slips of a set after they have been completed and assembled.

The printing of the numbers under the heading Dept., Clerk, Book and Check on the slips 1 and 2 and the punching of the holes representing these numbers in the card 3, is effected in the central position designated 1h, 2h, 3h as shown in Fig. 5 (also Fig. 17). The punches are shown in Fig. 9 and are carried in the framework 65 mounted on the bed plate 18 of the machine. The punches 66 are normally held in their upper position by springs 67, cooperating with a plate 68 resting under shoulders provided on all of the punches. The lower punch die is shown at 69 and the card stock is at 3h between the punches and the lower die 69. When some of the punches are depressed, they will penetrate the card stock and then when they are released the springs 67, pushing upwardly on the plate 68, will lift the punches out of the card and the stock is then free to be fed. The means for depressing the punches comprise movable lugs 70 projecting downwardly from the racks 71. One such rack is provided for each vertical column or numeral order. As shown in Fig. 3, these columns are designated 25 to 40 inclusive. In Fig. 9, the cross section shows one complete column of ten punches. Any one of these punches may be operated to perforate the card in the particular column by setting the lug 70 over that particular punch. The racks 71 are slidably mounted between the slats 72 and cooperate with segmental gears 73 pivoted at 74 and provided with setting levers 75. By raising or lowering the lever 75 the rack may be moved forward or backward to bring the lug 70 into position above any one of the ten punches. The racks 71 as well as the segmental gears 73 are mounted in a housing 76 carried by the rocking frame 58 and are lifted and lowered with the frame. Thus, when the frame is lowered, the lugs 70 engage their respective punches and force them downwardly through the card. Then when the frame is raised the punches are released and permitted to be lifted by their springs out from the card.

The printing of the numbers on the slips 1 and 2 is effected by type wheels 77, 78, 79 and 80 (Figs. 9 and 10). The printing of these numbers on the slip 2 is effected by the printing wheels 77. The printing of the numbers on the lower right half of the slip 1 is effected by the wheels 78. The printing of the numbers on the upper left half of slip 1 is effected by the printing wheels 79 and the printing on the lower left half of the slip 1 is effected by wheels 80. Each of the printing wheels is in the nature of a gear having the printing type engraved in the face of each gear tooth and each of these printing wheels meshes with a segmental gear 81.

Each of the racks 71 associated with a column of punches is connected to the four corresponding printing wheels. In other words, the rack 71 associated with the units order of the check number is connected to the four printing wheels for printing the units numeral in the check number on the slip 2; and in the three positions on the slip 1. Similarly, the rack 71 associated with the tens column of punches of this number are connected to the printing wheels belonging to the tens order of the number in the four positions on slips 1 and 2. To this end the segment 73 is connected by a link 82 to the segment 81 associated with the printing wheel 78. The latter segment is in turn connected by a link 83 to the segment 81 of the wheel 77. The racks 81 associated with the printing wheels 78 are connected by links 84 to arms 85 fixed on rods or shafts 86. These shafts are connected at their other ends to similar arms 88 connected by links 89 to the gear sectors 81 associated with printing wheels 79, at 90. The sectors 81 associated with wheels 79 are in turn connected through links 91 to the sectors 81 associated with the printing wheels 80. Thus the setting of the punch control racks to perforate particuar numerals also sets all of the printing wheels in the corresponding orders to print the same numerals. As shown in Figs. 9 and 10, the links 84 continue to the right and cooperate with stepped cams 92, 93 loose on shaft 94.

Cam 92 may be provided with six steps, and may be associated with the racks 81 associated with the punches and printing wheels identified with the tens column of the check number, while the cam 93 may have ten steps and be associated through a link 84 with the punches and type wheels of the units order of the check number.

Each of the stepped cams is fixed to a separate ratchet wheel 95. A pair of pawls 96 fixed with respect to each other are adapted to cooperate with the ratchet wheels 95, a spring 97 (Fig. 15) being provided to hold the pawls in cooperation with the ratchet wheels. The pawls are pivotally carried by an arm 98 which is fixed on the shaft 94 and is adapted to be rocked back and forth so that the pawls will rotate the ratchet wheels 95 clockwise one step at a time. The units order ratchet wheel 95 is provided with one deep notch 99. When the units pawl 96 is in any of the other notches of this ratchet wheel, the pawl associated with the tens order ratchet 95 will be out of engagement with its wheel, but when the units pawl drops into the deep notch of its ratchet wheel, the tens order pawl 96 will engage the teeth in the tens order ratchet and actuate the latter one step. The pawls operate once for each cycle of operation of the machine. Thus the units order ratchet wheel 95 and the corresponding stepped cam 93 will be moved one step for each cycle. This in turn will move the connecting link 84 one step to the left and through the segments 81 and interconnections described, change the positions of the printing wheels and the punch controlling lug 70 of the units order of the check number. This takes place after each printing and punching operation. In this way, the tens numeral progresses once for every ten steps of the units order.

Figure 6:
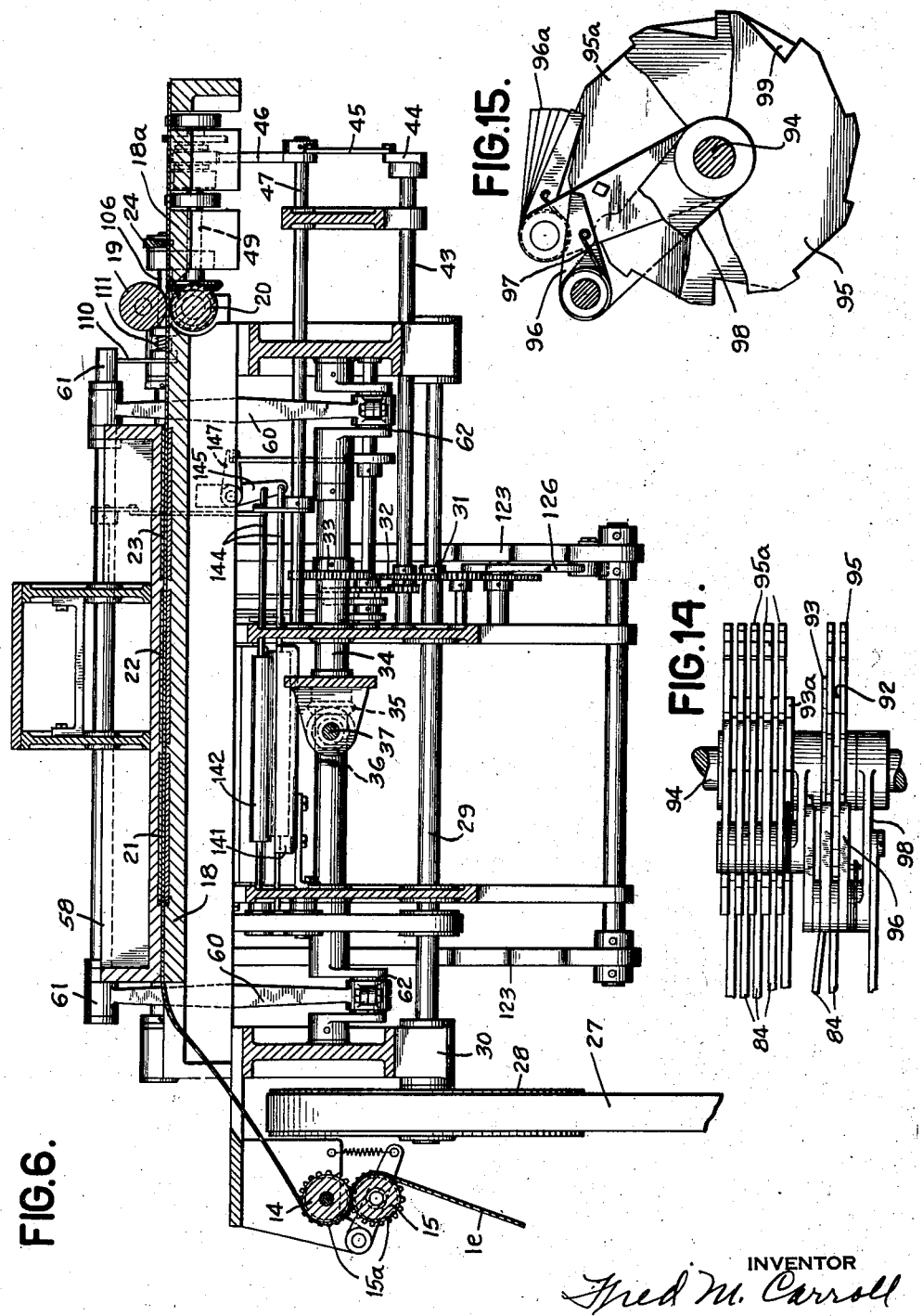
Fig. 6 is a sectional elevation taken substantially on line 6—6 of Fig. 5 with the supporting framework of the machine omitted.
Figure 8:
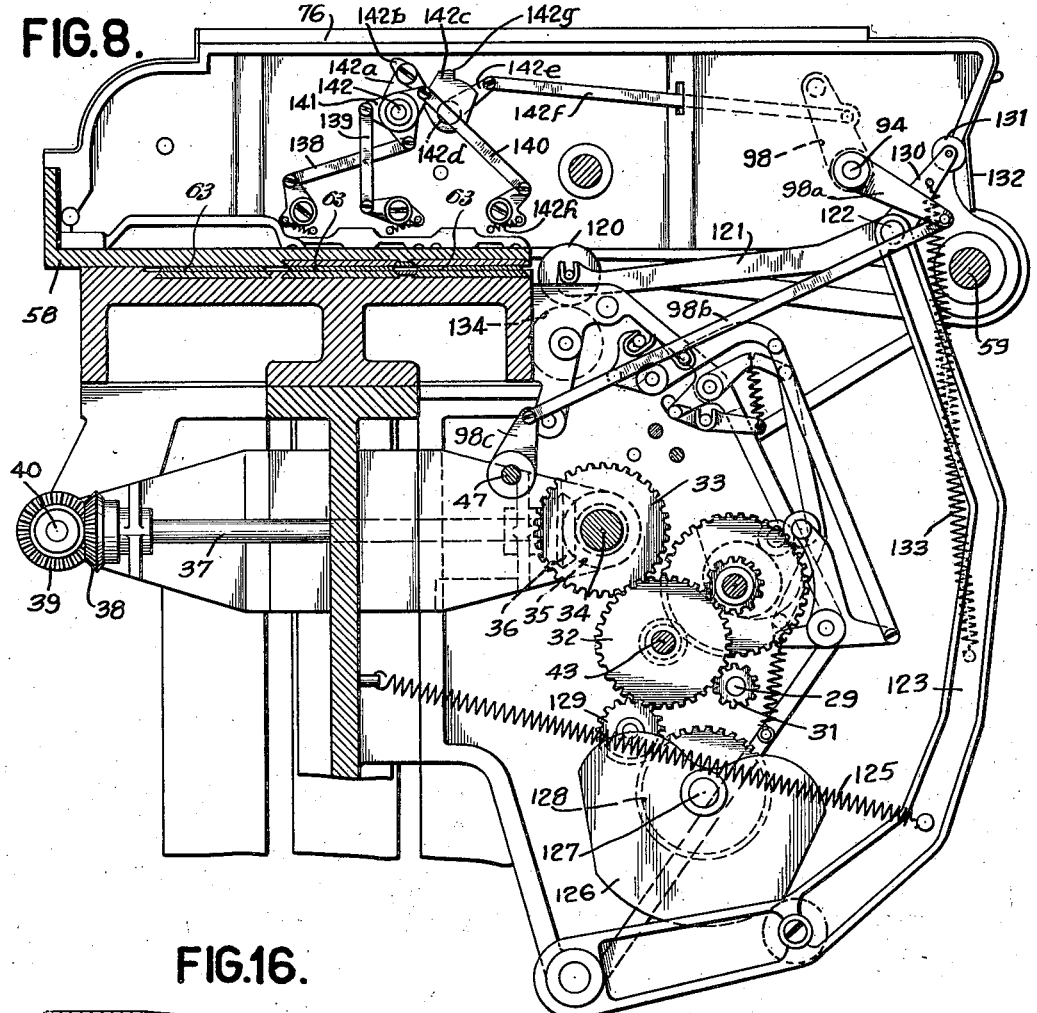
Fig. 8 is a sectional side elevation taken on line 8—8 of Fig. 5.

The ratchet wheel 95 of the tens order which is associated with the stepped cam 92 will move the connecting link associated with the punches and type wheels of the tens order of the check number to effect an advance in the numeral of the tens order. According to this arrangement, the device is adapted to number the checks from 1 to 59 at which time the punch setting and printing wheel setting are again in position to begin numbering a new set of check slips beginning with 1. For operating the pawls 96, an arm 98a fixed on shaft 94 (Fig. 8) is connected through through link 98b to an arm 98c fixed on shaft 47 (Figs. 6 and 8). This shaft as has been seen in connection with Fig. 11 is rocked back and forth. Connecting links 84 (Figs. 9, 10) associated with the printing wheels and punches for printing and punching the book number may be associated with additional stepped cams 93a each of which is associated with a separate ratchet wheel 95a. A set of pawls 96a is associated with the ratchet wheels 95a and are set progressively farther away (higher) from their respective ratchets 95a. Each of the ratchet wheels 95a is provided with a deep notch similar to notch 99. The depth of the deep notch in these wheels varies so that after the units order wheel has advanced ten steps the tens order pawl will drop into its ratchet wheel and actuate the latter one step. Similarly, after the tens order wheel has moved ten steps the hundreds order pawl will drop into its ratchet wheel and actuate the latter one step. This mechanism is well known and is therefore not shown in all its details here.

The progression in the setting of the punches and type wheels for printing the department number and clerk number will depend upon the needs of the particular store for which the books are made up. After the desired number of book sets bearing a particular clerk's number or department number has been made up, those numbers may be changed by manual operation of the setting levers 75 as described.

When the setting of the punch lugs 70 and the printing wheels for the book number is effected by the setting of the lever 75, it will be necessary to effect a similar setting of the stepped cams 93a. For this purpose, each of the ratchet wheels 95a may cooperate with a pawl 100 (Fig. 9). These pawls may normally serve to lock the ratchets in the positions to which they have been turned by the actuating pawls 96a. These pawls may also serve to advance their ratchets 95a one step by being moved downwardly. The pawls are carried by sliding members 101 having projections 102. Springs 103 are connected between the pawls 100 and the slides 101 to hold the pawls in co-operation with the ratchet wheels, and springs 104 hold the slides 101 in normal position. Depression of any slide 101 will advance its corresponding ratchet wheel 95a one step. Then when the slide is released pawl 100 will return to its normal position. By depressing the slides repeatedly the ratchets 95a and stepped cams may be advanced step by step to the position desired.

*Locking type wheels*

The type wheels may be locked in position during printing, by means of locking bars or bails 135, 136, 137, (Figs. 9 and 10). These bails are connected by links 138, 139, 140 to arms 141 fixed on shaft 142 and are rocked into locking position before each printing operation, and out of such position after printing has been effected so that the wheels may be turned to advance the numbering.

Fixed on shaft 142 is an arm 142a (Fig. 8) carrying a spring-controlled by-pass member 142b. A cam 142c pivoted at 142d is fixed with respect to arm 142e. The latter arm is connected by link 142f to the arm 98 which rocks back and forth as shown and described.

When cam 142c rocks to the left it pushes member 142b to the left and rocks shaft 142 counter-clockwise. This moves the bails into engagement with the printing wheels. At the end of the stroke of cam 142c to the left, and after printing has been completed, member 142b drops off the point 142g as springs 142h move the bails out of contact with the printing wheels. When cam 142c rocks back to the right the by-pass member 142b rocks counterclockwise without moving arm 142a.

*Cutting the slips*

During each cycle of operation of the machine, when the frame 58 descends to effect printing and punching, the cutting blade 24 (Figs. 11 and 12) is also depressed. This blade cooperates with the ledge 105 (Fig. 12) and cuts off the finished slips, permitting them to rest upon the bed plate in the positions 1j, 2j, and 3j (Fig. 5). The cutting blade is fixed on shaft 106 which has a depending arm 107 connected by a spring 108 to the fixed bracket 109. The spring serves to normally hold the blade in its upper position. An arm 110 carried by the shaft 106 reaches under the projecting rod 61 so that during each cycle when the frame 58 is lowered the rod 61 will depress the arm 110 and rotate the shaft 106 to operate the blade 24. The arm 110 may be resiliently connected to the shaft 106 by means of a spring 111.

*Feeding the finished slips*

After the slips have been cut off in the positions 1j, 2j and 3j they are arranged one on top of the other, the card 3 being at the bottom, the duplicate slip 2 on top of the card 3 and the original slip 1 at the top. Directly under the slips in this position are two endless feed belts 112 having upwardly projecting fingers 113 (Figs. 5 and 11). These belts are mounted on wheels 114, 115. The wheels 115 are fixed on shaft 116 to which is also fixed a gear 117 meshing with gear 51.

When the gear sector 46 swings upwardly after feeding of the paper stock as previously described, the gear 48 will cause pawl 50 to turn gear 51 and gear 117 fixed on shaft 116 to cause the wheels 115 to rotate counterclockwise as viewed in Fig. 11. This will cause the fingers 113 on the belts 112 to engage the rear edge of the slip 1, moving the latter to the left in Fig. 11, up over the guide member 118 so that the slip 1 is thus pushed over the top of the slip 2. The fingers 113 now engage the edge of the slip 2 as well as the slip 1 and move both of these over similar guide member 119 and drop both of these slips over the top of the card 3. At this time, the fingers 113 engage the edge of the card 3 and moved all three of the slips toward the left where they will be deposited by a device 25a in proper order in the tray 25. The device 25a is pivoted at 25b and is provided with a projection 25c. A stud 25d fixed to wheel 114 is adapted to depress arm 25e. This will rock arms 25b and 25c to raise the device 25d and deposit the cards or slips in the tray 25.

*Operation of the inking roller*

The type 55, 56, 57 (Fig. 7) and the type wheels 77, 78, 79 and 80 (Fig. 9) which are in the same plane in the lower portion of the frame 58, are adapted to be supplied with ink by an inking roller 120 carried by arms 121. These arms are pivotally mounted at 122 to arms 123 which are in turn pivoted at 124. Springs 125 tend to rock the arms 123 counterclockwise under control of a cam 126 mounted on a shaft 127 (Fig. 8). The shaft is provided with a gear 128 meshing with an idler 129 which meshes with gear 32 on shaft 43. An arm 130 fixed with respect to arms 121 is provided with a cam follower 131 adapted to cooperate with a plate 132.

Spring 133 tends to rock the arms 121 upwardly to lift the inking roller 120. Normally the follower 131 cooperating with the plate 132 holds the inking roller in its lower position, in cooperation with another roller 134. As the arms 123 rock toward the left under control of cam 126, the cam follower 131 will be permitted to move downwardly and the springs 133 will lift the inking roller 120 upwardly against the type and type wheels. This, of course, takes place when the frame 58 is raised or while it is being moved to its upper position. Arms 123 by moving to the left and back to the right, cause the inking roller to travel over the face of all of the type and then back again to the normal position of Fig. 8 so as to be out of the way before the frame 58 again reaches printing (lowered) position.

Figure 16:
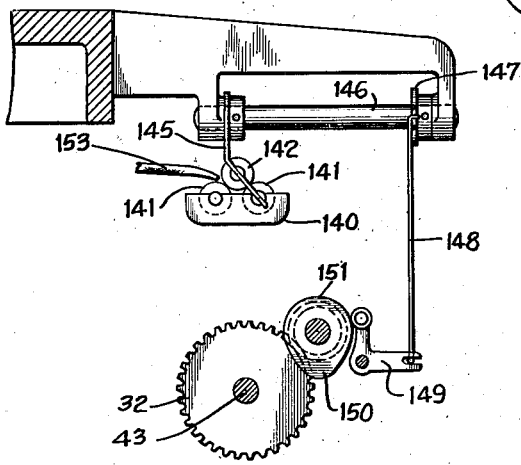
Fig. 16 is a detail of the inking device for the printing type.

The ink for the rollers 120, 134 is supplied by a reservoir or trough 140 (Figs. 7 and 16). Rollers 141 in the reservoir pass the ink on to a roller 142, and over a succession of rollers 143 to the roller 134. One of the rollers 141 and roller 142 are carried on spindles 144 which are attached at one end to an arm 145 (Figs. 6 and 16) fixed on shaft 146 having an arm 147 connected by link 148 to bell crank arm 149. This arm is a cam follower cooperating with cam 150 connected by gear 151 to gear 32. This moves the ink rollers 141, 142 endwise, one a little more than the other, to spread the ink evenly over their surfaces. When the ink has passed over the intermediate rollers to the inking roller 120 it will be properly thinned and distributed. A belt 152 (Fig. 7) may be used to cause the inking rollers to turn, and the ink may be fed to the rollers and the trough 140 through a tube 153.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is as follows:

1. In a machine of the class described, means for simultaneously printing a plurality of cards, means for punching predetermined ones of said cards, means for automatically varying the setting of parts of said punching means for serial numbering, and means for assembling the cards in predetermined order.

2. In a machine of the class described, a plurality of punches for punching records, a carrier, type wheels and a punch actuator mounted on said carrier, means for lowering the carrier to effect printing and operation of the punches, and means for automatically setting the printing wheels and punch actuator.

3. In a machine of the class described, a plurality of punches for punching records, a carrier, type wheels and punch actuators mounted on said carrier, means for lowering the carrier to cause the wheels to print upon the records and to effect operation of the punches, and means for effecting simultaneous setting of the printing wheels and punch actuators for serial number printing and punching.

4. In a machine of the class described, a printing table, a plurality of punches fixed to said table for punching records thereon, a type carrier, means for lowering the carrier to effect printing on the record, and means in said carrier for selectively actuating said punches when the carrier is lowered for printing.

5. In a machine of the class described, means for simultaneously feeding a plurality of strips, means for effecting form printing upon said strips, means for printing serial numbers in certain fields of the forms on the strips, means for effecting serial number punching in other fields of the forms, means for cutting the strip into separate sheets, and means for automatically collecting and arranging the sheets in predetermined order.

6. In a machine of the class described, means for feeding a plurality of strips, means for effecting form printing upon the strips, means for cutting the strips into separate sheets, means for scoring the separate sheets differently, and means for automatically collecting and arranging the sheets in predetermined order.

7. In a machine of the class described, means for producing records for controlling accounting machines and duplicate sheets of such records, said means including punches for perforating the control record, printing mechanisms for printing upon the duplicate sheet, and means for automatically arranging said records and duplicate sheets on top of each other, interspersing the duplicate sheets between the perforated control records.

FRED M. CARROLL.